(12) United States Patent
Fong

(10) Patent No.: US 8,390,649 B2
(45) Date of Patent: Mar. 5, 2013

(54) ELECTRONIC DEVICE INPUT CONTROL SYSTEM AND METHOD

(75) Inventor: Chee Keat Fong, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1489 days.

(21) Appl. No.: 11/799,400

(22) Filed: Apr. 30, 2007

(65) Prior Publication Data

US 2008/0266328 A1 Oct. 30, 2008

(51) Int. Cl.
*G09G 5/34* (2006.01)
(52) U.S. Cl. ....................................................... 345/672
(58) Field of Classification Search .................. 345/672, 345/682, 684
See application file for complete search history.

(56) References Cited

U.S. PATENT DOCUMENTS

| | | | |
|---|---|---|---|
| 5,196,838 A | 3/1993 | Meier et al. | |
| 5,339,391 A | 8/1994 | Wroblewski et al. | |
| 5,495,566 A | 2/1996 | Kwatinetz | |
| 5,936,618 A | 8/1999 | Spiero et al. | |
| 6,771,279 B2 | 8/2004 | Syukri | |
| 6,842,677 B2* | 1/2005 | Pathare | 701/36 |
| 7,420,476 B2* | 9/2008 | Stiffler | 340/945 |
| 2004/0100479 A1 | 5/2004 | Nakano et al. | |
| 2004/0131043 A1* | 7/2004 | Keller | 370/351 |
| 2005/0083299 A1 | 4/2005 | Nagasaka | |
| 2006/0103633 A1 | 5/2006 | Gioeli et al. | |
| 2006/0107213 A1 | 5/2006 | Kumar et al. | |
| 2006/0242595 A1 | 10/2006 | Kizumi | |
| 2006/0246940 A1 | 11/2006 | Foxenland | |
| 2007/0002018 A1 | 1/2007 | Mori | |
| 2007/0268246 A1* | 11/2007 | Hyatt | 345/156 |

FOREIGN PATENT DOCUMENTS

EP 0440105 A2 * 8/1991

OTHER PUBLICATIONS

Antonio Haro, Koichi Mori, Vidya Setlur, Tolga Capin, Mobile camera-based adaptive viewing, 2005, ACM International Conference Proceeding Series; Proceedings of the 4th international conference on Mobile and ubiquitous multimedia table of contents, vol. 154, pp. 78-83.*

Defintion of vector at Dictionary.com, May 14, 2010, http://dictionary.reference.com/browse/vector, pp. 1-7.*

Axel Kramer, Translucent Patches—Dissolving Windows -, 1994, Symposium on User Interface Software and Technology, Proceedings of the 7th annual ACM symposium on User interface software and technology, Marina del Rey, California, United States, ISBN:0-89791-657-3, pp. 121-130.*

* cited by examiner

*Primary Examiner* — Jeffery A Brier

(57) ABSTRACT

An electronic device comprises an input translation module configured to translate relative motion of the electronic device into input to an application executing on the electronic device, the application causing image content to be displayed on a display screen of the electronic device, and an input control interface configured to indicate at least one component of the relative motion relative to a reference point.

20 Claims, 3 Drawing Sheets

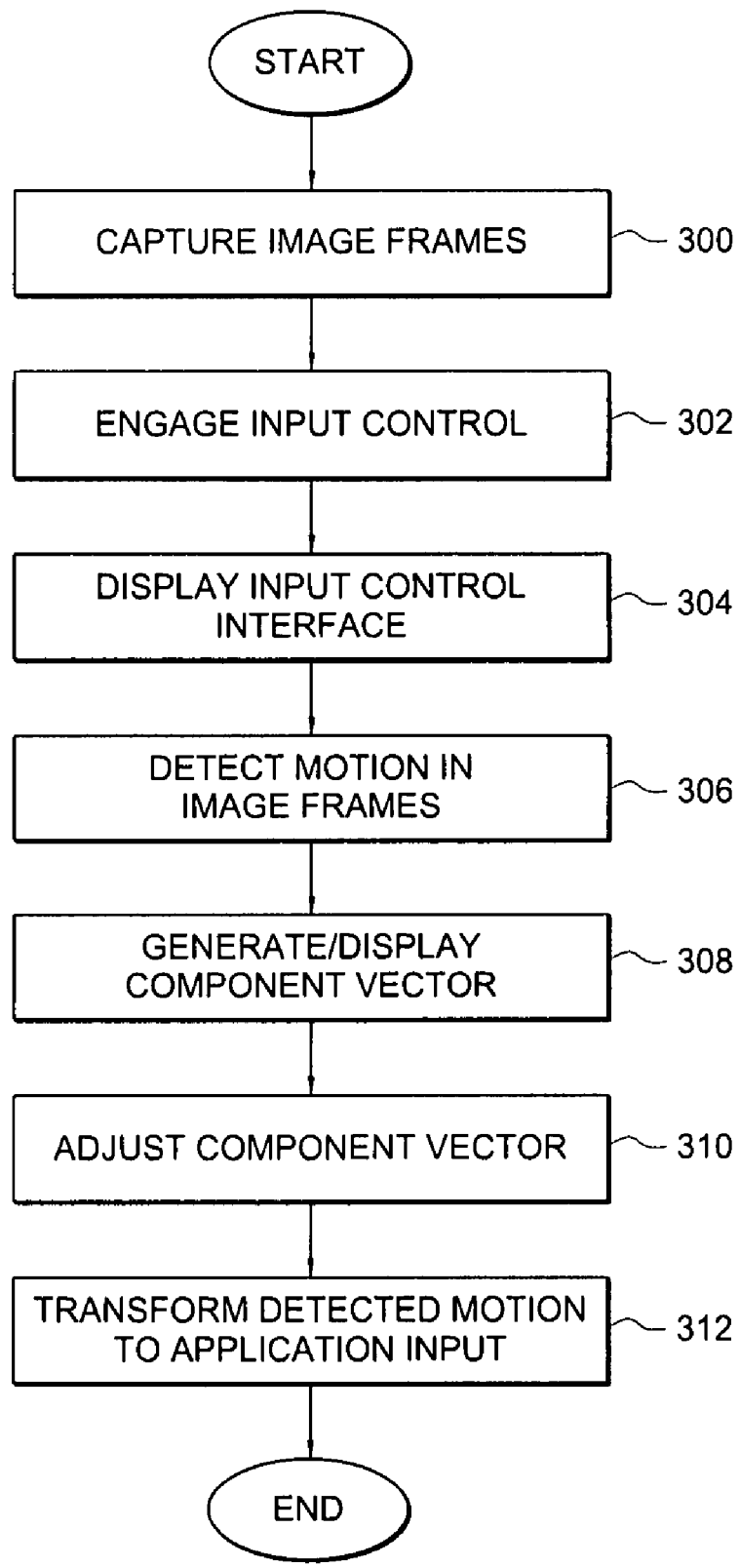

ELECTRONIC DEVICE INPUT CONTROL SYSTEM AND METHOD

BACKGROUND

Personal digital assistants (PDAs), cellular telephones and other types of portable electronic devices generally have a display screen for viewing image content thereon. However, because of the portable nature of such devices, the display screen is relatively small. Thus, some types image content displayed on the display screen is either reduced in size/resolution or only a small portion of the content is displayed, thereby requiring the user to manipulate such content using a touchpad, mouse-type input, buttons, or otherwise, which can be difficult and cumbersome.

BRIEF DESCRIPTION OF THE DRAWINGS

FIG. 3 is a flow diagram illustrating an embodiment of an input control method.

DETAILED DESCRIPTION OF THE DRAWINGS

Figure 1:
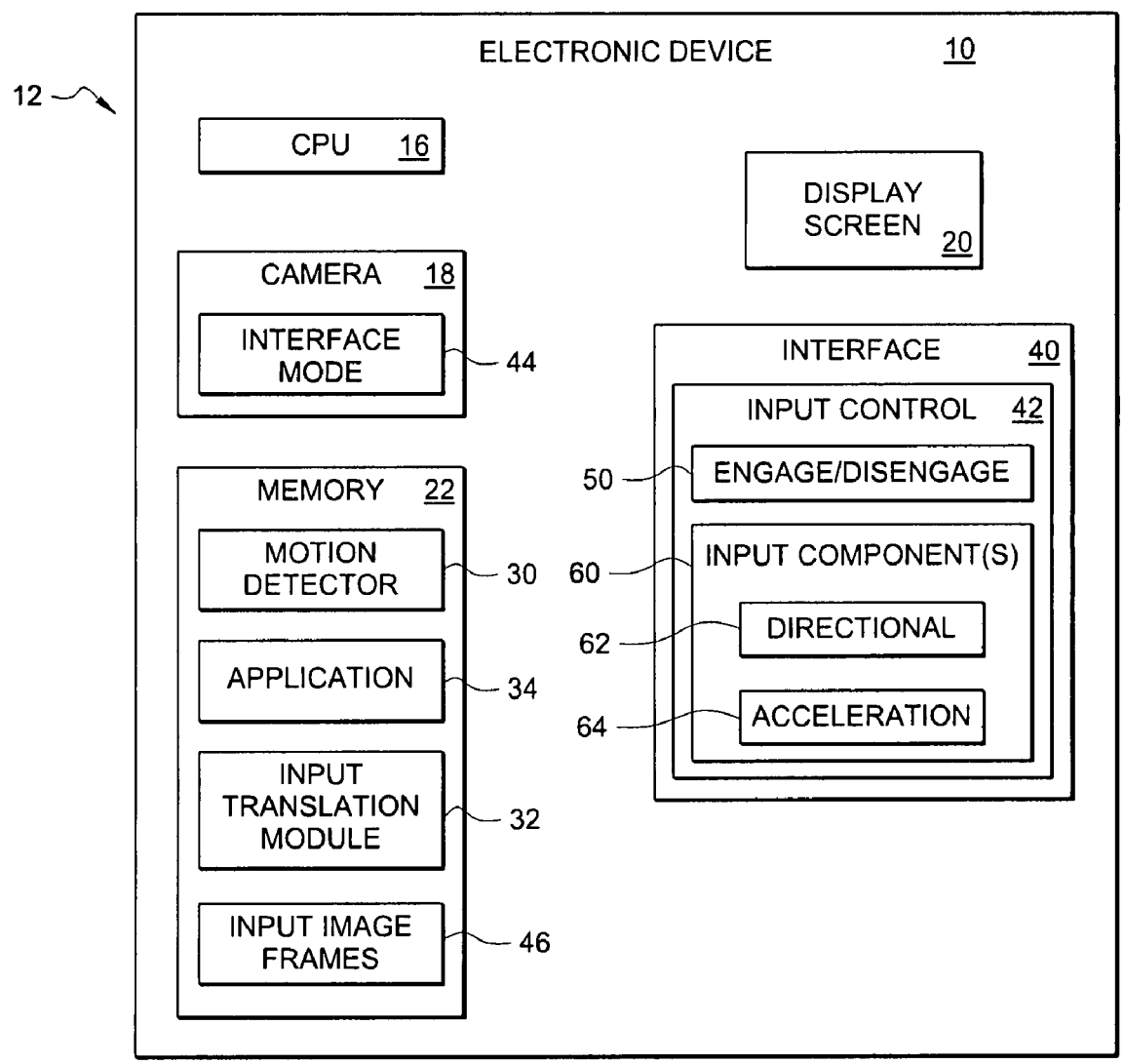
FIG. 1 is a block diagrams illustrating an electronic device in which an embodiment of an input control system is employed to advantage.

FIG. 1 is a block diagram illustrating an electronic device 10 in which an embodiment of an input control system 12 is employed to advantage. Electronic device 10 may comprise any type of electronic device or computing system such as, but not limited to, a personal digital assistant (PDA), a cellular telephone, a notebook computer, a tablet computer, or any other type of portable electronic device. In the embodiment illustrated in FIG. 1, electronic device 10 comprises a central processing unit (CPU) 16, a camera 18, a display screen 20, and a memory 22. Camera 18 may comprise any type of imaging device for capturing real-time image content in the form of a series of still pictures, a series of images in the form of a movie, or otherwise. Display screen 20 may comprise any type of display element for displaying image content thereon such as, but not limited to, a liquid crystal display (LCD).

In the embodiment illustrated in FIG. 1, system 12 comprises a motion detector 30 and an input translation module 32. Motion detector 30 and/or input translation module 32 may comprise software, hardware, firmware, or a combination thereof. In FIG. 1, motion detector 30 and input translation module 32 are illustrated as being stored in memory 22 so as to be accessible and executable by CPU 16. However, it should be understood that motion detector 30 and/or input translation module 32 may be otherwise stored. In FIG. 1, memory 22 also comprises an application 34 which may comprise any type of executable program such as, but not limited to, an electronic mail application, a web browser, an image viewing or editing program, or any other type of application where image content generated and/or otherwise obtained by such application 34 is displayable on display screen 20 to which a user may wish to interact. Motion detector 30 and input translation module 32 are configured to detect relative motion of electronic device 10 in three-dimensional space (e.g., by a user moving electronic device 10 upwardly, downwardly, diagonally, etc.) and translate that relative motion into input to an application executing on electronic device 10 (e.g., panning across an image, scrolling through a document, etc.). The relative motion of electronic device 10 may be determined by analyzing image content captured using camera 18 (e.g., comparing a series of captured images), using an accelerometer disposed on or within electronic device 10, or otherwise. For ease of description and illustration, the detection of relative motion of electronic device 10 in three-dimensional space and translation of that relative motion into input to an application executing on electronic device 10 will be illustratively described below using image content captured by camera 18; however, as indicated above, it should be understood that other methods for detecting the relative motion of electronic device 10 may be used.

In the embodiment illustrated in FIG. 1, system 12 also comprises an interface 40 for enabling a user to interact with electronic device 10. For example, interface 40 may comprise a touchpad, keypad, touch-sensitive display screen, or any other type of device enabling a user to provide input to electronic device 10. In FIG. 1, interface 40 comprises an input control interface 42 for controlling input to electronic device 10 using camera 18. For example, in some embodiments, system 12 uses camera 18 to translate relative motion of electronic device 10 into input provided to one or more applications 34. In operation, camera 18 is configured to capture a plurality and/or series of images (e.g., real-time, low resolution images) which are analyzed by motion detector 30 to determine relative motion of electronic device 10. For example, if electronic device 10 comprises a cellular telephone having camera 18 disposed thereon, camera 18 is configured to capture a plurality of images. A user of the portable cellular telephone may move the portable cellular telephone in three-dimensional space during such image acquisition such that motion detector 30 detects the relative motion of electronic device 10 introduced by the user as indicated by the captured images. The detected relative motion of electronic device 10 is transformed into input to application 34 to perform such operations as scrolling, panning, or other types of input. Thus, for example, if a user of the portable telephone has downloaded a web page onto the portable telephone, a user of the portable telephone may scroll upwardly/downwardly to view the content of the web page by moving the portable telephone upwardly/downwardly in three-dimensional space such that such movement is converted and/or otherwise translated into input to scroll upwardly/downwardly in a web browser or other application 34 to view such web page.

In FIG. 1, camera 18 comprises an interface mode 44 which enables image content captured by camera 18 to be used to determine relative motion of electronic device 10 while enabling image content associated with application 34 to be displayed on display screen 20. For example, when camera 18 is activated on electronic device 10, image content acquired by camera 18 is generally displayed on display screen 20 to enable a user of electronic device 10 to capture a still image or a movie. Interface mode 44 enables image content associated with application 34 to be displayed on display screen 20 instead of the images captured by camera 18 while image content captured by camera 18 is used for motion detection. In FIG. 1, the image content captured by camera 18 that is used for determining relative motion of electronic device 10 is illustrated as being stored in memory 22 as input image frames 46.

Input control interface 42 may comprise any type of device for enabling input to application 34 based on relative motion of electronic device 10 such as, but not limited to, a button, switch, graphical icon, or otherwise, that enables such motion-based input to be toggled between on and off states. In the embodiment illustrated in FIG. 1, input control interface 42 comprises an engage/disengage interface 50 that is usable to initiate and/or actuate such motion-based input to application 34. For example, in some embodiments, engage/disengage interface 50 may comprise a button that a user of electronic device 10 actuates to turn on camera 18 and/or otherwise place camera 18 into interface mode 44, and to activate and/or otherwise launch motion detector 30 and input translation module 32. For example, in operation, a user of electronic device 10 may have a photo application 34 launched thereon such that a photograph is displayed on display screen 20. The user may actuate engage/disengage interface 50 such that camera 18 begins acquiring a series of input image frames 46 that are analyzed by motion detector 30 to detect relative motion of electronic device 10. Motion detector 30 may use a variety of different types of motion analysis techniques for determining relative motion between captured image frames 46. Input translation module 32 interfaces with motion detector 30 to identify and/or otherwise determine the relative motion of electronic device 10 and transform and/or otherwise translate such relative motion into an input to application 34, thereby facilitating panning and/or scrolling of such photograph displayed on display screen 20.

In some embodiments, engage/disengage interface 50 may be configured such that a user actuates and holds such actuation while moving electronic device 10 in three-dimensional space to use such motion of electronic device 10 to perform such panning and/or scrolling operation in application 34. Thus, in this example, when the user desires to cease panning and/or scrolling, the user releases engage/disengage interface 50. However, it should be understood that starting and stopping such motion-based input to application 34 may be otherwise configured. In some embodiments, relative motion of electronic device 10 may be configured to produce real-time scrolling/panning of image content displayed on display screen 20 such that as a user moves electronic device 10 in three-dimensional space in a downward direction, image content displayed on display screen 20 is scrolled in a similar direction in a real-time or near real-time presentation. However, it should be understood that in other embodiments, the image content on display screen 20 may be automatically adjusted from one position to another position without presenting a scrolling appearance (e.g., automatically transitioning from the image content displayed on display screen 20 when the motion-based input is initiated to another image displayed on display screen 20 representative of the result of the motion-based input).

In some embodiments, input control interface 42 may comprise a window or other type of interface image generated and displayed on display screen 20 or another element of electronic device 20 to provide a user of electronic device 10 with an indication of such motion-based input. For example, in the embodiment illustrated in FIG. 1, input control interface 42 comprises input components 60 which are representative indications of the relative motion of electronic device 10. In FIG. 1, input components 60 comprise a directional component 62 and an acceleration component 64. Directional component 62 comprises information associated with a relative direction of relative motion of electronic device 10 in three-dimensional space relative to a particular or initial reference point. Acceleration component 64 comprises information associated with a magnitude or level of relative motion of electronic device 10. However, it should be understood that additional and/or other input components 60 may be provided.

Figure 2A:
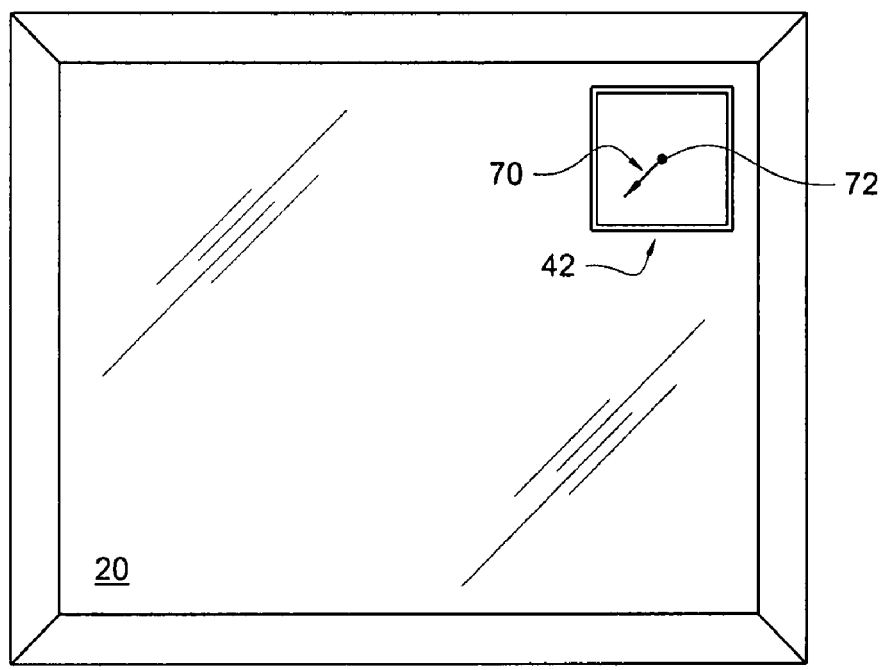
FIGS. 2A-2C are diagrams illustrating an embodiment of an input control interface of the system of FIG. 1.
Figure 2B:
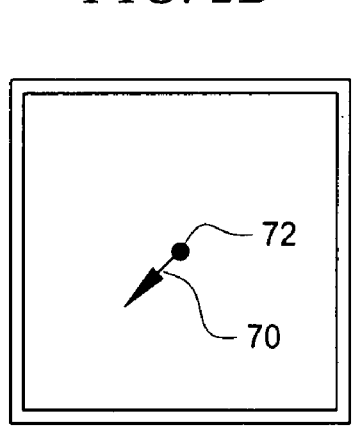
Figure 2C:
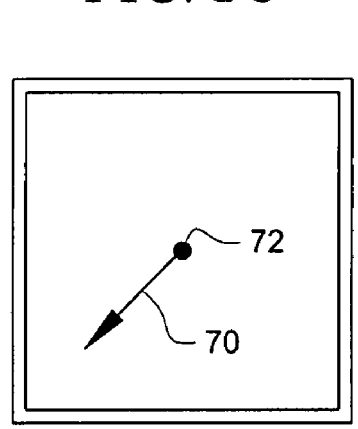

FIGS. 2A-2C, are diagrams illustrating an embodiment of input control interface 42. In the embodiment illustrated in FIG. 2A, input control interface 42 is illustrated as being displayed on display screen 20. For example, in FIG. 2A, input control interface 42 is illustrated as a separately displayed window on display screen 20. However, it should be understood that input control interface 42 may be otherwise located and/or displayed (e.g., as an overlayed image on display screen 20 such that input control interface 42 is overlayed in a translucent or other manner onto image content displayed on display screen 20 by a particular application 34). In the embodiment illustrated in FIGS. 2A-2C, input control interface 42 comprises a vector 70 that is generated and/or otherwise extends in a variety of different directions and to a variety of different lengths from a reference point 72. Reference point 72 is representative of a three dimensional reference point identified and/or otherwise used by motion detector 30 when determining the relative motion of electronic device 10 (e.g., a point in space identified and/or otherwise used as an initial reference point when system 12 is initiated to begin motion-based input to application 34). Vector 70 is representative of one or more input components 60 for such motion-based input to application 34. For example, as illustrated in FIGS. 2A-2C, a direction of vector 70 is used to indicate directional component 62 of such motion-based input, and a length of vector 70 is representative of acceleration component 64.

In operation, a user of electronic device 10 initiates motion-based input to application 34 by actuating engage/disengage interface 50 (e.g., by depressing a button or otherwise and continuing to hold such button in a depressed and/or actuated state). While the user actuates engage/disengage interface 50, the user may move electronic device 10 in three-dimensional space. When motion-based input is activated, camera 18 begins acquiring and/or otherwise capturing input image frames 46 which are analyzed by motion detector 30 to determine relative motion of electronic device 10. Additionally, in response to activation of motion-based input, motion detector 30 identifies a particular reference point 72 in one or an initial input-based image frame 46 that is used to indicate a direction of relative motion and a magnitude or amplitude of relative motion from the initial reference point 72.

Referring to FIGS. 2B and 2C, vector 70 is used to illustrate and/or otherwise represent directional component 62 and acceleration component 64 of such motion-based input. For example, in some embodiments of operation, while a user actuates and/or otherwise holds engage/disengage interface 50, the user may move electronic device 10 in three-dimensional space in a desired direction in order to control input to application 34 in a similar direction. In response to such movement of electronic device 10, motion detector 30 detects such relative motion of electronic device 10 and coordinates and/or otherwise interfaces such information with input translation module 32, which provides such input to application 34. Referring to FIG. 2B, in this example, a user has moved electronic device 10 only slightly in the direction indicated by vector 70 in FIG. 2B. In this embodiment of operation, the user is not required to continually move electronic device 10 in a particular direction to obtain continued input to application 34 in a corresponding direction. For example, in this embodiment of operation, such motion-based input is continued to be provided to application 34 in the direction and/or amplitude as indicated by FIG. 2B until the user deactuates engage/disengage interface 50. Thus, in this example, a user of electronic device 10 need not provide continuous movement of electronic device 10 in order to pan and/or scroll relative to image content displayed on display screen 20. Instead, input translation module 32 is configured to continue to provide the motion-based input to application 34 as indicated by FIG. 2B until the user deactuates engage/disengage interface 50.

In some embodiments, the amplitude or length of vector 70 indicates acceleration component 64 and/or the speed of such panning and/or scrolling input. For example, referring to FIG. 2C, vector 70 illustrated in FIG. 2C is longer than vector 70 illustrated in FIG. 2B. In FIG. 2C, a user of electronic device 10 has moved electronic device 10 in three-dimensional space a greater dimension/distance than in FIG. 2B (e.g., six inches in FIG. 2C versus one inch in FIG. 2B). The additional movement of electronic device 10 is used by system 12 to control a speed of such panning/scrolling input to application 34. Thus, in the example of FIG. 2C, a user of electronic device 10 may initiate motion-based input to application 34 and move electronic device 10 approximately six inches in the direction indicated by vector 70 in FIG. 2C. The user may hold electronic device 10 in the position approximately six inches from an initial starting position while scrolling/panning of image content displayed on display screen 20 continues in the direction and speed as indicated by vector 70 in FIG. 2C. While the user has engage/disengage interface 50 actuated, the user may continue to move electronic device 10 in three dimensional space such that vector 70 is dynamically responsive to such movement (e.g., vector 70 is dynamically modified and/or otherwise adjusted in direction and/or length indicative of a change in a desired panning/scrolling direction and/or a desired speed of such scrolling/panning input). Thus, referring to FIG. 2C, while the user actuates engage/disengage interface 50, the user may move electronic device 10 in a reverse direction back toward reference point 72 to decrease the speed of such scrolling/panning input which would be illustratively indicated by a reduction in the length of vector 70.

FIG. 3 is a flow diagram illustrating an embodiment of an input control method. The method begins at block 300, where camera 18 is used to capture input image frames 46. At block 302, engage/disengage interface 50 is actuated to engage and/or otherwise initiate motion-based input to application 34. At block 304, input control interface 42 is displayed on display screen 20 to facilitate display of input component 60.

At block 306, motion detector 30 detects relative motion of electronic device 10 based on input image frames 46. At block 308, input control interface 42 generates and/or otherwise displays vector 70 for illustratively indicating the direction and/or acceleration of such relative motion. At block 310, input control interface 42 adjusts vector 70 based on the direction and/or relative motion of electronic device 10 from an initial reference point. At block 312, input translation module 32 transforms such detected motion of electronic device 10 into input to application 34.

Thus, embodiments of system 12 enable a user to control input to an application 34 on electronic device 10 using relative movement of electronic device 10 while providing a user with an interface that displays one or more components of such motion-based input. It should be understood that in the described method, certain functions may be omitted, accomplished in a sequence different from that depicted in FIG. 3, or performed simultaneously. Also, it should be understood that the method depicted in FIG. 3 may be altered to encompass any of the other features or aspects as described elsewhere in the specification. Further, embodiments may be implemented in software and can be adapted to run on different platforms and operating systems. In particular, functions implemented by motion detector 30, input translation module 32, and input control interface 42, for example, may be provided as an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electro-magnetic, infrared, or semiconductor system, apparatus, device, or propagation medium.

What is claimed is:

1. An electronic device, comprising:
a housing configured such that the electronic device is a handheld electronic device configured to be manually lifted, manually held and manually moved in three-dimensional space;
a display screen on an exterior of the housing;
an engage/disengage interface configured to selectively actuate and deactuate a motion-based input mode when the electronic device is powered on;
an input translation module operatively associated with the engage/disengage interface, the input translation module configured to translate relative motion of the electronic device into motion-based input indicative of the relative motion that is input to an application executing on the electronic device when the engage/disengage interface is actuated, and the input translation module configured to ignore the relative motion of the electronic device when the engage/disengage interface is deactuated, the application causing image content to be displayed on a display screen of the electronic device;
wherein the electronic device is configured to cause the display screen to display a graphical indication of the motion-based input, wherein upon initial actuation of the motion-based input mode, a point of reference is established, wherein the graphical indication of motion-based input has (1) a first characteristic, an orientation, indicating a first directional component of the motion-based input corresponding to a direction of movement of the electronic device during the motion-based input mode with respect to the point of reference and (2) a second characteristic indicating a second component of the motion-based input different than the first directional component, the second component of motion-based input corresponding to a magnitude of movement of the electronic device during a period of time extending from the initial actuation of the motion-based input mode to deactuation of the motion-based input mode.

2. The device of claim 1, further comprising a camera, wherein the relative motion is detected based on a plurality of image frames captured by the camera of the electronic device.

3. The device of claim 2, wherein the input translation module is configured to cease image frame acquisition by the camera in response to detecting decreased activity associated with the application.

4. The device of claim 1, wherein the electronic device is configured to cause the display screen to display image content, and wherein the graphical indication is overlaid on the image content displayed in the display screen, wherein the graphical indication overlaid on the image content appears translucent.

5. The device of claim 1, wherein the input translation module is configured to continue inputting motion-based input to the application even if the electronic device is no longer moving so that the application continues scrolling until the engage/disengage interface is deactuated without the user needing to provide continuous movement of the electronic device to effect scrolling of displayed image content.

6. The device of claim 1, wherein the input translation module is configured to continue inputting the same motion-based input as when the electronic device was last moving, even if the electronic device is no longer moving, to the application.

7. The device of claim 6, wherein the input translation module is configured to stop inputting motion-based input to the application executing on the electronic device only when the user deactuates the engage/disengage interface.

8. The device of claim 7, wherein the application continues scrolling in the same direction and at the same speed until the engage/disengage interface is deactuated.

9. The device of claim 1, wherein motion-based input to the application executing on the electronic device causes automatic transitioning from image content displayed on a display screen when the motion-based input is initiated, to another image displayed on the display screen, without scrolling between images.

10. The device of claim 1, wherein the second characteristic comprises a size of the graphical indication.

11. The device of claim 1, wherein the second characteristic comprises a length of the graphical indication.

12. The device of claim 1, wherein the second component comprises an acceleration component.

13. The device of claim 12, wherein the electronic device is configured to cause the display screen display a series of images, wherein the directional component is a scrolling or panning direction through a series of images and wherein the acceleration component is a speed of the scrolling or panning.

14. The device of claim 1, wherein the graphical indication comprises a vector having the orientation, wherein the second characteristic of the vector is a length of the vector.

15. The device of claim 14, wherein the electronic device is configured to cause a display screen to display image content and wherein vector is overlaid on the image content.

16. The device of claim 15, wherein the vector is translucent.

17. The device of claim 1, wherein the engage/disengage interface comprises a button configured to maintain actuation of the motion-based input mode while being depressed and to deactuate the motion-based input mode when released.

18. The device of claim 1, wherein (1) in response to movement of the electronic device during the motion-based input mode away from the reference point, the electronic device causes the display screen to increase a size of the graphical indication and (2) in response to movement of the electronic device during the motion-based input mode towards the reference point, the electronic device causes the display screen to decrease the size of the graphical indication.

19. An input control method comprising:
detecting relative motion of a handheld electronic device only after a user actuates an engage/disengage interface when the handheld electronic device is powered on;
translating the relative motion of the electronic device into input to an application executing on the handheld electronic device, the application causing image content to be displayed on a display screen of the handheld electronic device; and
displaying, on a display screen of the electronic device, a graphical indication of the input, wherein upon initial actuation of the engage/disengage interface, a point of reference is established, wherein the graphical indication of the input has (1) a first characteristic, an orientation, indicating a first directional component of the input corresponding to a direction of movement of the electronic device during actuation of the engage/disengage with respect to the point of reference and (2) a second characteristic indicating a second component of the input different than the first directional component, the second component of the input corresponding to a magnitude of movement of the electronic device during a period of time extending from the initial actuation of the engage that disengage interface to deactuation of the engage/disengage interface.

20. An electronic device comprising:
an exterior housing configured such that the electronic device is configured to be manually lifted, held and moved in three-dimensional space;
a display screen on an exterior of the housing;
a camera configured to capture a plurality of image frames;
a processor configured (1) to determine relative motion of the electronic device from the plurality of image frames and to translate the relative motion of the electronic device in the three-dimensional space into motion-based input to an application operating on the electronic device (2) to display a graphical indication of the motion based input; and
an engage/disengage interface configured to be held in an actuated state or released, wherein the graphical indication has (1) a first characteristic, an orientation, indicating a first directional component of the input corresponding to a direction of movement of the electronic device during holding of the engage/disengage and (2) a second characteristic indicating a second component of the input different than the first directional component, the second component of the input corresponding to a distance of movement of the electronic device during a period of time during which the engage that disengage interface is held until being released.

* * * * *